United States Patent

Magg et al.

[15] 3,682,014
[45] Aug. 8, 1972

[54] DOWN-SHIFTING TRANSMISSION LOCK

[72] Inventors: Alfred Magg; Friedrich Schreiner, both of Friedrichshafen, Germany

[73] Assignee: Zahnradfabrik Friedrichshafen Aktiengesellschaft, Friedrichshafen, Germany

[22] Filed: Sept. 14, 1970

[21] Appl. No.: 71,924

[30] Foreign Application Priority Data

Sept. 13, 1969 Germany.........P 19 46 496.1

[52] U.S. Cl. .................... 74/336, 74/752 A, 74/866
[51] Int. Cl. ......................... F16h 5/42, B60k 21/00
[58] Field of Search .............................. 74/335, 336

[56] References Cited

UNITED STATES PATENTS

| | | |
|---|---|---|
| 2,835,136 | 5/1958 | Berthiez ..................... 74/335 |
| 3,061,058 | 10/1962 | Barth ...................... 74/745 X |
| 3,407,676 | 10/1968 | Magg ......................... 74/335 |
| 3,530,668 | 9/1970 | Siebers et al ............. 74/336 X |

*Primary Examiner*—Arthur T. McKeon
*Attorney*—Karl F. Ross

[57] ABSTRACT

A fluid-control transmission lock is provided to prevent unwanted downshifting of a multiple-speed transmission and especially a servocontrol or power-assist transmission. The lock is speed-responsive and prevents, for example, the spontaneous downshifting from one speed range to another or from a higher gear ratio within a particular range to an impermissibly lower gear ratio within that range, in accordance with the vehicle speed.

15 Claims, 8 Drawing Figures

INVENTORS:
Alfred Magg
Friedrich Schreiner

ATTORNEY:
Karl F. Ross

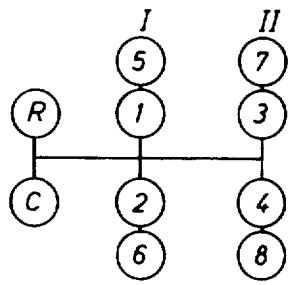
Fig. 5
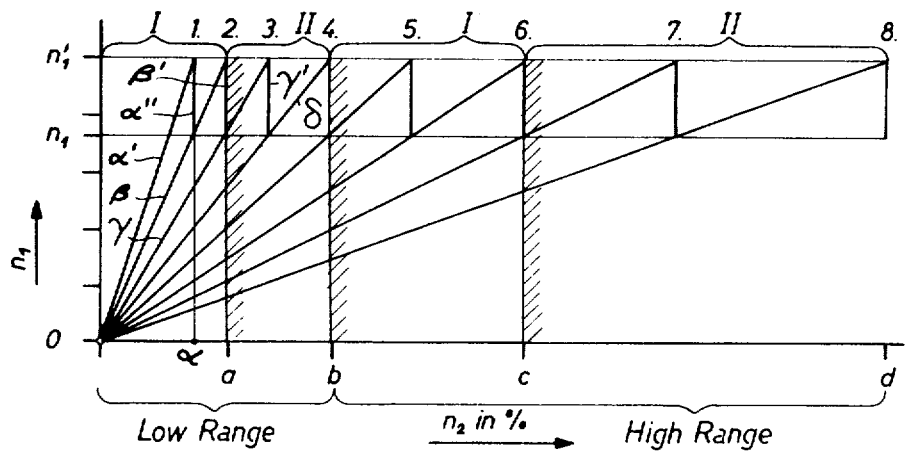
Fig. 6
Fig. 7
| $n_2$-Range | Current |
|---|---|
| 0 — a | 0 |
| a — b | + |
| b — c | 0 |
| c — d | + |
Fig. 8
| $n_2$-Range | Current |
|---|---|
| 0 — b | 0 |
| b — d | + |
INVENTORS:
Alfred Magg
Friedrich Schreiner
ATTORNEY:
Karl J. Ross

DOWN-SHIFTING TRANSMISSION LOCK

FIELD OF THE INVENTION

Our present invention relates to a speed-controlled lock arrangement for preventing undesirable downshifting for multiple-speed transmissions for automotive vehicles and the like and especially vehicles having an axially shiftable and pivotal or rotatable gear-control shaft.

BACKGROUND OF THE INVENTION

It is not uncommon in a multiple-speed transmission, having one or more speed ranges, e.g., a high range and a low range, to provide a shifter shaft which is coupled directly or indirectly to the gear-shift lever and, in turn, is connected directly or indirectly to the gear-shifting forks of the transmission so that, upon axial displacement of the gear-shift shaft, under the control or patterned movement of the gear-shift lever, a number of gear ratios are established between an automotive-vehicle engine and the remainder of the power train. The individual gear ratios of a particular range are referred to as "speeds" and depending upon the angular axial positions of the shift shaft, may be first, second, third, fourth etc. speeds whereby a progressively higher ratio is provided between the output shaft of the transmission and the crankshaft of the vehicles.

Of course, several ranges may be provided, with switchover between them by a pedal, lever, button or handle, generally provided in conjunction with the gear-shift lever so that an additional set of forward speeds, e.g., fifth, sixth, seventh and eighth speeds, may be provided by operation of the gear-shifter shaft. Here again, the ratio of the speeds of the output shaft of the transmission to the crankshaft increases in a stepwise manner. While the gearing will define the actual ratios, it has been found to be advantageous to provide a high range whose "speeds" are double the corresponding "-speeds" of a low range. In *Principles of Automotive Vehicles*, U.S. Government Printing Office, Jan. 1956, there is described at page 285 a direct transmission having a gear-shift lever and a shifter shaft which is both axially movable and rotatable to provide four forward speeds. This publication also describes synchromesh transmissions in which the switchover between each speed and the next higher speed is facilitated by appropriate regulation of a clutch arrangement between the gears. Furthermore, a system is there described for power assist of the transmission, i.e., wherein a servomechanism is provided between the gear-shift lever and the shifter shaft.

With synchronous transmissions and especially servo-actuated synchromesh transmissions, various difficulties have arisen as a result of spontaneously initiated downshifting of the gears. Transmissions of this type require little effort on the part of the vehicle operator and hence are more prone to self-activation than transmissions without servocontrol or nonsynchromesh transmissions and spontaneous shifting has occurred in the past without detection by the operator. Such downshifting may involve the shifting from a relatively high speed in a particular range to a speed several units lower in the sequence, e.g. from fourth speed to first speed or second speed or from eighth speed to fifth or sixth speed or a spontaneous downshift from the high range to a low range, e.g., from eighth speed to fourth speed or from fifth speed to first speed.

The problems encountered with such spontaneous downshifting will be self-evident. For one thing, it constitutes a danger to the operator and to people and property in the region of the vehicle because of the sudden loss of complete control. Furthermore, since the vehicle may be traveling at a rate of speed excessive for the spontaneous downshift, considerable strain may develop within the transmission between the power train and the engine or elsewhere along the power train. It is not uncommon under such circumstances that the engine, clutch and/or transmission will be overloaded.

OBJECTS OF THE INVENTION

It is, therefore, the principal object of the present invention to provide an improved system for preventing undesirable downshifting in a transmission having a shifter shaft which is axially shiftable and rotatable about its axis.

It is another object of our invention to provide a transmission-control arrangement, especially for synchromesh transmissions having a plurality of forward speeds, which will avoid the disadvantages hitherto encountered and permit downshifting in accordance with vehicle velocity to prevent undue stressing of the engine, transmission, clutch or other parts of the power train.

It is also an object of our invention to provide, in a transmission of the character described, means for preventing spontaneous undesirable downshifting from a high speed range having a plurality of selectable speeds, to a low speed range.

Furthermore, we have as our object the provision of an improved servocontrolled or servoactivated multispeed transmission with two or more sets or ranges of forward speeds and means for preventing spontaneous or undesired downshifting of the transmission.

SUMMARY OF THE INVENTION

These objects are obtained, in accordance with the present invention, in a transmission arrangement for automotive vehicles and especially an arrangement in which the mechanism between the crankshaft of the engine and the wheel-driving axle is a multiple-operated or servo-assist or servo-actuated transmission with a plurality of speeds in a particular speed range and, possibly, a plurality of speed ranges, the control being effected at least in part by a shifter shaft which is axially displaceable to select between sets of transmission ratios which are successive or consecutive in the gear-ratio progression. The shaft is rotatable to select individual speeds from among the transmission ratios of each set. According to the principles of the present invention, a speed-controlled transmission lock is provided to prevent axial displacement of the shaft in an impermissible manner to effect a downshifting or ratio jump form one set to another when, for example, the transmission is in any speed position other than the lowest position of a relatively high-speed set. The principal characteristic of the invention, therefore, is a transmission arrangement for an automotive vehicle which comprises a multispeed transmission having a ratio-changing gear-shifting shaft axially displaceable into at least two positions to select respective sets of consecutive transmission ratios, e.g. the sets of forward speeds represented by first and second gear or third and fourth gear, respectively; the shaft is rotatable to select individual ratios of the respective sets, i.e. to place the transmission in first gear or second gear when the axial position of the shaft corresponds to the lower-speed set and between third gear and fourth gear when the axial position of the shaft corresponds to the higher speed set.

The invention comprises a vehicle-speed-responsive lock operatively connected to this shaft for limiting axial displacement of the shaft between the higher speed position and the lower speed position upon the vehicle speed exceeding a predetermined (threshold) value conductive to safe downshifting from a higher transmission ratio to a lower transmission ratio. The invention also provides for a vehicle-speed-responsive lock preventing downshifting from one speed range to another when the transmission is provided with a plurality of speed ranges, each of which is controlled by the shaft and which may have a further actuator associated therewith to select among the ranges; in this case, a downshift from the high-shift range to a low shift range is prevented when the vehicle is traveling at speeds excessive for safe downshifting.

While additional principles of the present invention have been set forth below both in general terms and in detail, it is believed to be desirable to establish a terminology which will be followed hereinafter in describing the invention since the transmission art employs numerous expressions in an interchangeable and alternative manner. Applicants intend the term "range" to define an entire span of transmission ratios and especially a plurality of such ratios in a consecutive order. For example, in an eight-speed transmission, having eight forward speeds, a reverse speed and a "crawl" speed, the forward speeds may be subdivided into a low range (first, second, third and fourth speeds) and a high-speed range (fifth, sixth, seventh and eighth speeds). Of course, a larger number of ranges may be provided and each range may have more than four speeds. When referring to the transmission ratio, i.e., the ratio of the angular velocity of the input shaft of the transmission to the angular velocity of the output shaft, the ratio will be said to increase as the speeds increase from the lowest speed to the highest speed.

At first speed, sometimes described as "first gear" the ratio is relatively low so that the wheels are driven with a small angular velocity but at high torque. Conversely, at eighth speed (or eighth gear) the maximum ratio is obtained and the vehicle wheels are driven at the highest angular velocity with the smallest torque. In general, each "range," as defined earlier, will comprise a plurality (e.g., two) of "sets" of speeds so that, for example, the low-speed set of the low-speed range of an eight-speed transmission will generally comprise first and second speeds (first and second gears) while the high-speed set of the low-speed range is third and fourth speeds (third and fourth gears). The low-speed set of the high-speed range is fifth and sixth speeds (fifth and sixth gears) whereas the high-speed set of the high-speed range is seventh and eighth speeds (seventh and eighth gears). The sets of transmission ratios each thus include a plurality of successive speeds or ratios, only two being present in each set of the eight-speed transmission described by way of example.

Reference has been made to impermissible downshifting and, in general, this can be defined as a downshifting from the higher range to a lower range at a speed which is excessive or a downshifting from a higher-speed set of either range to a lower-speed set thereof. It follows that downshifting from a higher speed to a lower speed within any set is permitted and it should be noted that the closeness of the gear ratios within any set precludes excessive strain upon the engine, clutch or transmission as a result of this form of downshifting. It follows also that downshifting is excluded (provided the vehicle speed is excessive) between a high-speed set of the high-speed range and the low-speed set of the low-speed range, but may be permitted between the lowest-speed position of a high-speed range and the highest-speed position of the next lower range.

In the aforementioned publication, there is described a gear-shifter shaft which is illustrative of control systems in which the gear-shifter shaft is displaceable between axial positions to select a particular set of speeds and is rotatable to select a particular speed of the selected set. An eight-speed transmission operable with an axially displaceable and rotatable shifter shaft, for example, consists of a synchro-locked four speed gearbox with a crawling speed and a rear mounted planetary range. The selection of range is also synchro-locked. A doubling of the speeds of the four-speed gearbox is achieved by means of the planetary gear. There are then available, together with the crawling speed, 9 forward speeds. By the construction of the gearbox and the type of gear changing it is possible these speeds to shift successively. An actuating means for the shifter shaft itself is illustrated and described in commonly assigned U.S. Pat. No. 3 282 122.

The present invention thus comprises a first lock arrangement preferably fluid-controlled which is designed to block axial displacement of the shifter shaft and prevent axial displacement from a high-speed set to a low-speed set in dependence upon the vehicle speed. The second transmission lock, which is also responsive to vehicle speed, is constituted as a spring-loaded valve which is operatively connected to a further gear set, provided ahead or behind the main transmission to establish a second speed range. This range may be established by a secondary transmission with the primary transmission being provided with the set-selection and gear-selection mechanism. Hence a speed-doubling transmission, preferably servoactuated by means of a hydraulic or pneumatic arrangement may be interposed between the engine and the speed-selection main transmission or may be provided between the output shaft of this transmission and the vehicle wheels. The control means may, consequently, include a shifter piston-and-cylinder arrangement which is energized to place the secondary transmission in operation. When a secondary transmission is used in the recited manner, the high and low-speed sets of the main transmission correspond in the two ranges, as to the individual speeds or gears.

According to an important feature of this invention the shifter cylinder for the auxiliary transmission is provided with a fluid-medium supply line which runs through a cut-off valve whose actuating member is operated by a cam disk carried by the main gear-shifter shaft and maintaining the valve open in the neutral position of the controls exclusively.

According to another feature of this invention, the first lock means includes a valve controlling fluid flow to a cylinder whose piston is connected with or provided upon the main gear-shifter shaft, the valve member being exposed to fluid pressure as generated by a speed-responsive device such as a pump driven at a rate determined by the vehicle speed. The pressure applied to the valve is, consequently, a function of the vehicle speed. However, since the system is intended to operate in a plurality of speed ranges and the position of the valve must compensate for the particular speed range in which the vehicle is operating at any moment, the valve is provided according to the invention with a servo motor or servo follower for providing a bias upon the valve member in accordance with the particular speed range. The biasing means may be an adjusting motor of the fluid-pressure type which prestresses a spring bearing upon the valve member and has a plurality of positions corresponding to the respective speed ranges. When the system is operating in a high speed range, for example, the prestress upon the spring is proportionately large whereas the spring stress is proportionately small when the system operates in the low speed range.

According to still another feature of this invention, the switch-over between the speed ranges is accomplished at least in part by fluid-responsive means including a range-selection cylinder, a piston of which is displaced from a low-speed range position to a high-speed range position when, for example, a valve upon the gear-shifter lever is operated. The adjusting device of the valve of the first lock means is preferably connected with a compartment of this cylinder in a closed system.

Still another feature resides in the provision of a fluid-operated selection system for the speed ranges which includes a pilot valve which may be manually actuated, e.g., on the gear-shift lever as noted earlier, and a relay valve in parallel therewith for controlling the pressure fluid applied to the range-selection cylinder. When the pilot valve is employed, in conjunction with a relay valve the pilot valve may have small dimensions and may be more easily displaced than is the case when the range-switching valve is coupled directly between the source of pressure fluid and the range-selection cylinder. The second lock means of the invention, which prevents down-shifting from the upper speed range to a lower speed range according to the principles set forth above, may then be a spring-biased valve in the power-fluid path between the relay valve and the range-selection cylinder. Against the force of the biasing spring, may be applied a liquid pressure proportional to the vehicle speed and derived as noted earlier from a pump driven at a rate proportional to the vehicle speed.

We have also found it to be advantageous, in some cases, to provide electrical control means wherein the speed responsive transducer has an electrical output which is proportional to the vehicle speed and is provided to shift the valves of the first or second lock means. The transducer may be a pulse generator coupled with the vehicle means and producing a pulse train of a frequency provisional to the vehicle wheels. The range-selection system for accommodating the first lock means to the particular speed range of the vehicle may, therefore, include a pressure-responsive switch in the range-selection pressure circuit.

DESCRIPTION OF THE DRAWING

The above and other objects, features and advantages of the present invention will become more readily apparent from the following description, reference being made to the accompanying drawing in which:

FIG. 5 is a diagram of the shifting pattern of the eight-speed drive;

FIG. 6 is a graph of the shifting characteristics;

FIG. 7 is a Table representing the condition of the first control valve in accordance with vehicle speed; and FIG. 8 is a Table illustrating the characteristics of a second control valve in terms of the vehicle speed.

SPECIFIC DESCRIPTION

Figure 1:
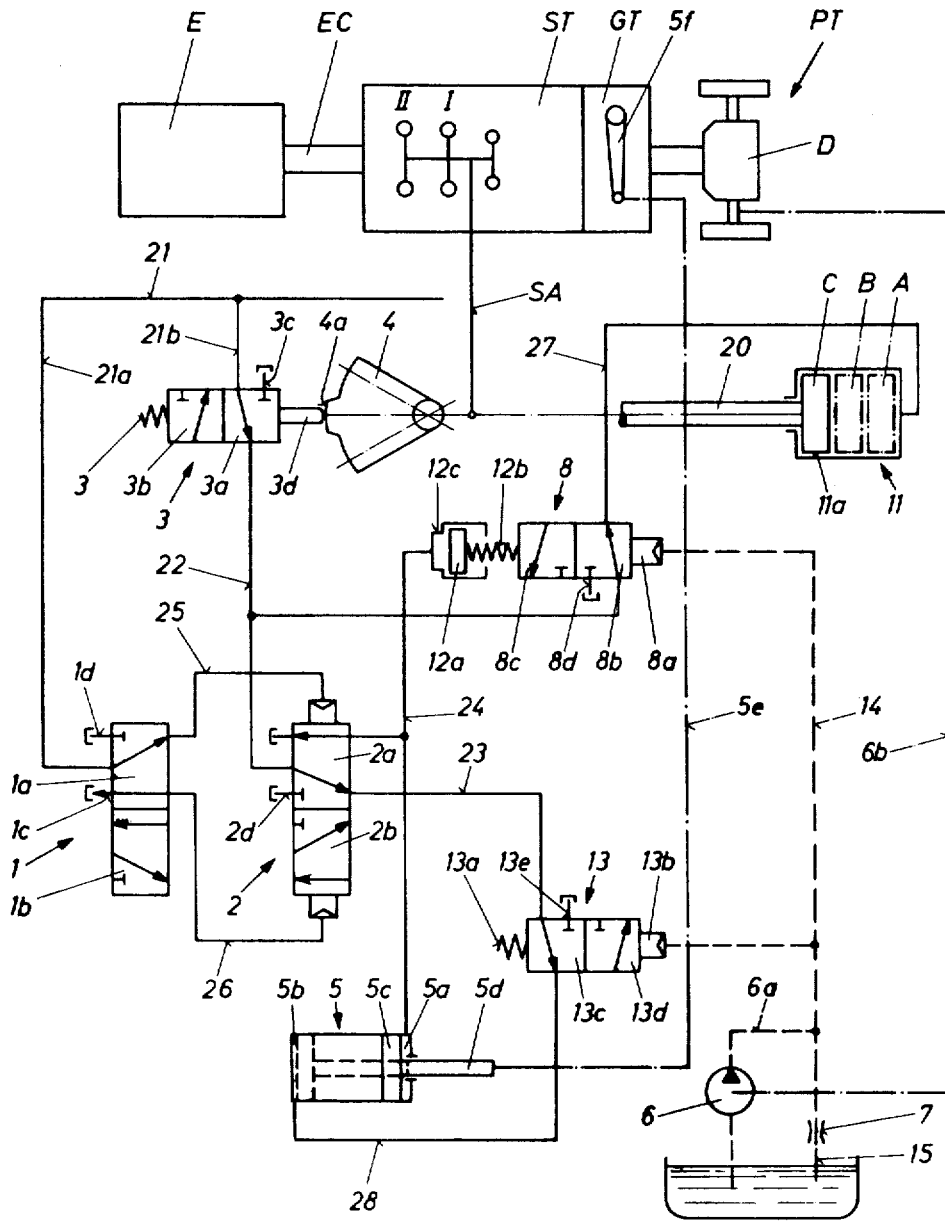
FIG. 1 is a diagram of a speed-responsive lock arrangement according to the present invention as applied to an eight-speed transmission for automotive vehicles.

In FIG. 1, we have shown a vehicle-transmission arrangement for an automotive vehicle whose internal-combustion engine E has a crankshaft EC driving a synchromesh transmission ST with four forward speeds in a low-speed set I and a high-speed set II as illustrated in FIG. 5. Between the synchromesh transmission ST, which can be servoactuated as represented by the line SA in FIG. 1 and may have an axially and rotatably displaceable gear-shifter shaft 20, and the differential D of the wheel-driving power train PT, there is provided a secondary or speed-doubling speed changer GT whose control member is operated via a shifter cylinder 5. To this end, the piston 5c of the cylinder 5 has a piston rod 5d coupled at 5e with the control member 5f of the speed-doubling transmission GT. As will be apparent from FIG. 5, therefore, gear selection is effected in either the high-speed or low-speed range, by displacing the shaft 20 axially to one of the sets, e.g., I and II, and then rotating the shaft to either side of its neutral position, thereby selecting the individual gears one or two or three or four of each set. The transmission GT has two operating conditions, the first of which permits direct drive of the wheels by the main transmission ST, and the other of which multiplies the speed by two. Hence each set I or II establishes any one of four speeds depending upon the position of cylinder 5 and the angular position of the shaft 20.

The secondary transmission GT is controlled purely pneumatically via a circuit which includes the main valve 3, a manual actuated valve 1 which is provided on the gear shift lever, a relay valve 2 and the double-acting cylinder 5. The pneumatic supply line 21 is connected at 21a to the valve 1 which has a first position 1a which is shown to be effective in FIG. 1, and a second position 1b. In the first position, the line 21a communicates with a duct 25 applying pneumatic pressure at he upper end of the relay valve 2. Simultaneously the valve section 1a connects the line 26 of the other end of the valve 2 to a vent 1c. In position 1b, the supply line 21a is connected to duct 26 whereas line 25 is connected to the vent 1d. In the illustrated mode of the valve 1, therefore, the operating member valve 2 is biased downwardly to render effective valve section 2a whereas reversal of valve 1 to render mode 1b effective, correspondingly switches over valve 2 into its mode 2b. In the operating mode 2a, air is delivered under pressure from a line 22 to a line 23 communicating with a compartment 5b on the left-hand side of the piston 5c. Conversely, a compartment 5a to the right-hand side of piston 5c is connected via line 24 to the vent 2c. In operating mode 2b, however, the supply line 22 communicates with line 24 whereas line 23 is vented at 2d.

As noted, the valve 1 is manually operated by the vehicle driver and may be provided directly upon the gear-shift lever (not shown). The valve 2, however, merely reproduces the movement of valve 1 and permits the latter to operate with little effort.

Line 22 derives from the supply line 21 via a position 3a of the cut-off valve 3 which is held open exclusively in the neutral position of the shaft 20 as illustrated. The valve 3 has a second operating position 3b in which line 22 is vented at 3c while the supply line 21b is blocked. The valve member 3d is urged by a spring 3e against a cam 4 rotatable with the shaft 20 and coupled therewith by, for example, being mounted directly upon the shaft. The cam 4 has a land 4a retaining the valve 3 in its open state only in the neutral position of the shaft 20. The neutral position, of course, is the position assumed by this shaft when it is swung neither clockwise nor counterclockwise to engage the individual strips of any particular set.

The actuation of the auxiliary transmission GT is performed as follows: If it is assumed that the piston 5c, in its illustrated position, solid lines in FIG. 1, maintains the transmission GT in its low-speed range, actuation of valve 1 will render mode 1b effective to apply fluid under pressure to line 26 and vent line 25. Valve 2 is shifted into mode 2b to apply pressure to line 24 while line 23 is vented, thereby displacing the piston 5c to the left. Reverse operation of valve 1 again shifts the piston 5c to the right. Each extreme position of the piston 5c, of course, represents a particular speed range of the transmission GT. In either range, the shaft 5b may be displaced axially and angularly to select among first through fourth speed or fifth through eight speed as indicated.

When the main transmission ST is "in gear", i.e., the shaft 20 is not in its neutral position, valve 3 sustains mode 3b at which line 22 is vented and the supply line 21b is blocked. Hence valve 1 may be actuated and will operate valve 2, but without any effect upon the cylinder 5, thereby excluding speed-range changes except in the "neutral" position.

In locking devices or mechanisms of the present invention are both speed-responsive in the sense that they are controlled in accordance with the speed of the vehicle. Otherwise, however, they operate independently of one another. The "first locking means" or "first transmission lock" of the present invention serves to prevent undesired downshifting from one set of speeds (e.g., set II) to another set of speeds (e.g., set I), thereby preventing the downshifting from third and fourth speeds to first and second speeds or from seventh and eighth speeds to fifth and sixth speeds, depending upon the range setting of the transmission. The first locking means, therefore, includes a cylinder 11 whose piston 11a is coupled with the shaft 20, the cylinder being energized to prevent the axial displacement of the shaft 20 corresponding to such down-shifting. The fluid flow to cylinder 11 is effected via lines 27 and is controlled by a valve 8 of the spring-loaded type.

The valve 8 has a first operating mode 8b in which line 27 communicates with a line 22a at the pressure of line 21 when the valve 3 is opened (mode 3a) by the cam 4. The other operating position or mode 8c of the valve 8 drains line 27 (and cylinder 11) to the vent 8d and blocks line 22a.

The spring-loading means 12 correspond to a positioning motor or servofollower having a piston 12a forming a seat for a spring 12b. The piston 12a is a reciprocable within a cylinder 12c maintained at the fluid pressure of chamber 5a via line 24. As the pressure within cylinder 12c increases, therefore, the piston 12a is shifted to the right to increase the spring bias urging the valve 8 into its operating position 8c against a countervailing pressure at cylinder 8a. The cylinder 8a forms the input representing the speed of the vehicle and renders the lock 11 speed-responsive. In the embodiment illustrated in FIG. 1, a hydraulic pump 6 circulates oil from a reservoir 15 into the latter through a throttle 7 so that, at the delivery side 6a of the pump, a pressure appears which is proportional to the vehicle speed.

As illustrated by the dot-dash line 6b, the pump 6 is driven by the power train at a rate proportional to the angular velocity of the vehicle wheels. A line 14 communicates the pressure at the delivery side of the pump 6 to the cylinder 8a. As the pressure in line 14 increases, representing an elevated vehicle speed, the force urging the valve 8 to the left (into operating position 8b) increases and adjusts the lock as will be apparent hereinafter.

The second transmission lock is constituted by a spring-loaded valve 13, the latter having a fixed-characteristic spring 13a biasing the valve in one direction against the fluid pressure applied by a cylinder 13b energized with the pressure in line 14. Hence this valve 13 is also controlled by hydraulic-fluid pressure in accordance with the speed of the vehicle. The valve 13 has a first operating mode or section 13c which is effective at high speeds as represented by a relatively high pressure at 13b, to connect a line 23 with line 28 communicating with the chamber 5b of the left-hand side of the piston 5c. In other words, the valve 13 is placed in the path of the pressure medium applied by relay valve 2 to the shifter cylinder 5. It is, therefore, possible to switch the speed range from high speed to low speed only when the valve 13 is in its position as illustrated in FIG. 1. As the pressure builds up in line 14, corresponding to an increased vehicle speed, this pressure may overcome the force of spring 13a and shift the valve 13 into position 13d in which line 28 is connected to the vent 13e and line 23 is blocked. When relay valve 2 is switched by operation of valve 1, therefore, the switchover from low range to high range is permitted. However, a downshifting cannot occur until the valve 13 is reversed.

It will be apparent that the valve 8 must be effective in both a low-speed range and in the high-speed range and that an adjustment of the bias of this valve in accordance with the speed range is necessary. To this end, the servomotor 12 is provided. Line 24 maintains the pressure in line 12c at that within chamber 5a and, at any rate, a pressure corresponding to the position of the range-selector piston 5c. When the latter is in its low-speed position as illustrated in FIG. 1, a low pressure is provided in chamber 12c to resist the pressure at 8a and the valve 8 is effective at low-vehicle speeds to block axial displacement of the shaft 20 unless the valve 8 has previously shifted to permit downshifting as indicated. When, however, the vehicle is operating at its high-speed range, the piston 5c assumes its position as illustrated in broken lines and the pressure within chamber 5a is relatively high. The higher pressure is communicated to cylinder 12c and biases the piston 12a to the right, thereby increasing the preloading of spring 12b and the force transmitted thereby to the cylinder 8.

Figure 2:
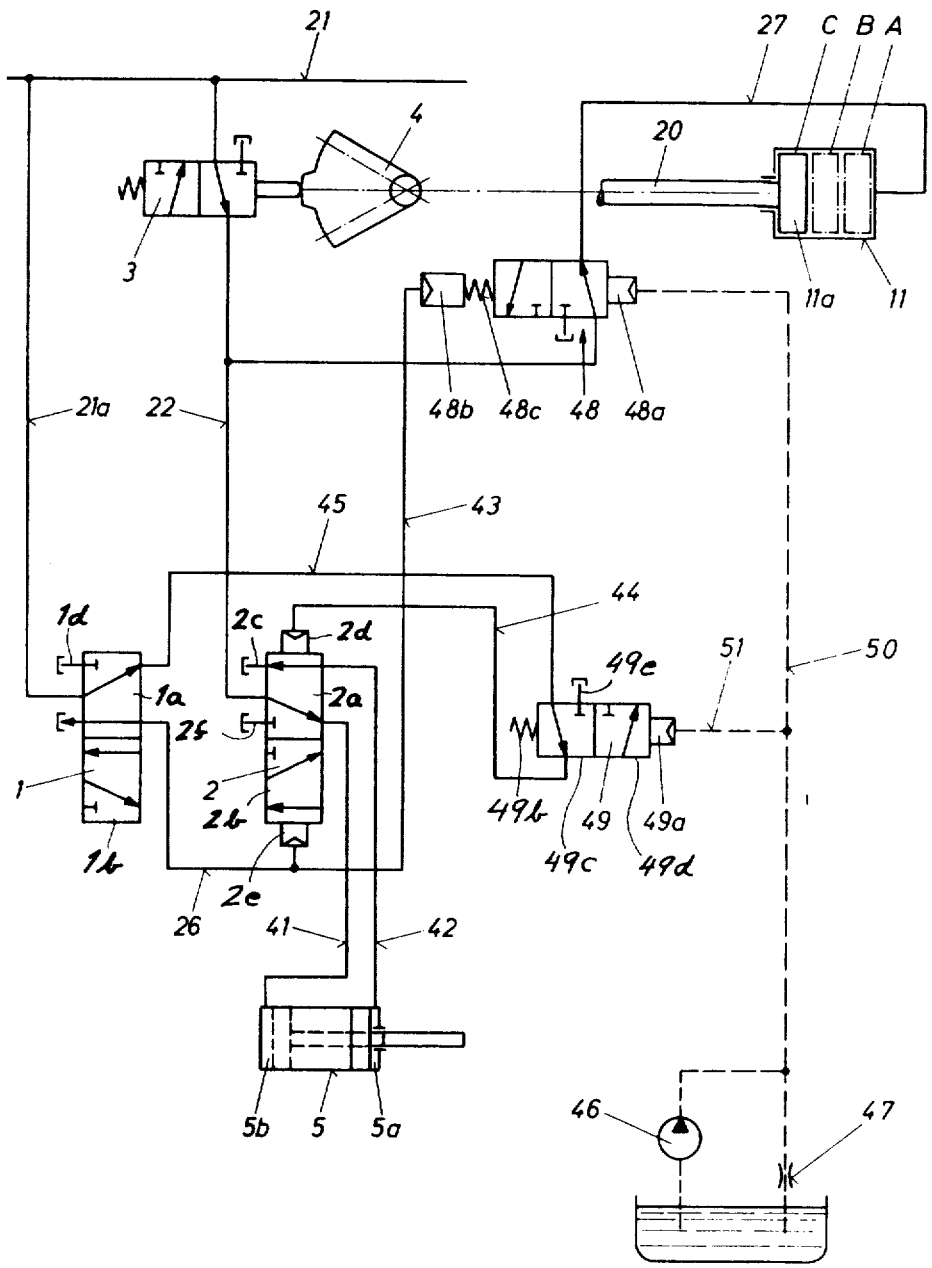
FIG. 2 is another diagram of the speed-controlled lock of FIG. 1 using hydraulically actuated valves.

The locking system for the transmission illustrated in FIGS. 1 and 2 consequently is constituted by two independent individually functioning locking devices, each of which is responsive to the vehicle speed. The first lock means 8, 11 is effective upon the axial movement of the shaft 20 of the four-speed main transmission to control transitions from set II speeds (speeds 3/4) to set I speeds (speeds 1/2) and the transition from speeds 7/8 to speeds 5/6 when the vehicle velocity is excessive to prevent such downshifting. The second transmission lock comprises the spring loaded valve 13 which can block line 23 which must be pressurized to provide the low-speed range.

The valves 8 and 13 are also energized with pressure fluid from the speed-pressure transducer represented by the pump 6 in combination with the throttle 7 so that the pressure appearing at 8a and 13b is proportional to the vehicle speed. In FIG. 6, we have diagrammed the effect of the vehicle-speed thresholds upon the lock. The abscissa in FIG. 6 represents the output speed of the transmission in percent of engine speed and, therefore, the vehicle speed ($n_2$), while the ordinate represents the engine speed, the switchover thresholds between first through eighth gears being designated at the top of this graph.

The engine is accelerated until the vehicle reaches the speed $n_2$ shown at $\alpha$ in FIG. 6, the acceleration being represented by the line $\alpha'$. At this point and within the engine speed range $n_1$ to $n_1'$, switchover between first and second gear or speed is permitted as represented at $\alpha''$. Again acceleration occurs to the vehicle speed represented at $a$ when engine acceleration as signified by $\beta$ to permit the transition from second speed to third speed along the line $\beta'$. Similarly, with each increase in vehicle speed, the transmission may be upshifted to the next higher speed as shown at $\gamma$, $\gamma'$ and $\sigma$ in FIG. 6. Downshifting is permitted between the consecutive speed as the vehicle velocity falls, in accordance with the conventional transmission practices.

According to the principles of the present invention, however, when the vehicle speed reaches the threshold $a$ at the maximum speed of gear set I, valve 8 is shifted to the position shown at 8c in FIG. 1 and displacement of the piston within cylinder 11 is permitted to allow the shaft 20 to move to a position corresponding to set II. When the transmission is in the high-speed range, the vehicle speed must reach the threshold $c$ to permit the pressure and the right-hand side of valve 8 to balance the augmented pressure of the adjusting cylinder 12 and allow upshifting to set II corresponding to seventh and eighth speeds. It will be evident that downshifting is precluded once the threshold $a$ or the threshold $c$ is exceeded since, in each case, the pressure at the right-hand side of the valve 8 suffices to bring this valve into its position 8b and deliver fluid to the cylinder 11 to prevent axial movement of the shaft 20 until the fluid pressure again falls below the appropriate threshold.

The threshold $b$ of FIG. 6 between the low range and the high range is established by the spring 13a and is effective to require the vehicle speed to drop below this level before the valve 13 is shifted into mode 13d and which the shifter cylinder 5 permits the speed changer GT to drop the speed to the low range. The speed threshold $b$ is reached only at the high speed (fourth gear) of the low-speed range.

In FIG. 2 we have shown a modified system for controlling the transmission lock which, apart from the components which are numbered differently, is identical to the system of FIG. 1. In this embodiment, the range-selection cylinder 5 is hydraulically energized by the lines 41 and 42 from the relay valve 2 directly and the locking valve 49 for preventing downshifting from the high speed range to the low speed range is not disposed in the selector-cylinder power line, but rather in the pilot-valve circuit of the relay valve. In this case, the dimensions of valve 49 may be reduced.

More particularly, the pilot valve 1 has a position 1a in which line 21a delivers fluid to a line 45 connected to the valve 49 in its position 49c to apply the pressure of the pilot valve to the upper cylinder 2d of the valve 2.

Valve 2 has one position 2a in which the line 22 is connected to the range-selector cylinder 5 behind the piston via line 41 while the compartment ahead of the piston is connected to a vent 2c via the line 42. Hence, when the pilot valve 1 is actuated or brought into the position illustrated in FIG. 2, fluid is permitted to flow through section 1a of this valve and the section 49c of the second locking valve 49 to the upper cylinder 2d of the relay valve 2. The latter is biased downwardly to render effective the position 2a and permit the main power fluid to be applied via line 41 to the range-selector cylinder 5 and bring the transmission into its low-speed range in the manner previously described.

To switch the system to the high-speed range, however, the valve section 1b is rendered effective, thereby connecting line 45 to the vent 1d and depressurizing line 44 by bleeding fluid therein to the vent 49e or 1d. At the same time, pressure from line 21a is applied to the lower cylinder 2e to shift the valve 2 upwardly and render effectively the valve section 2b which applies the main pressure of line 22 to the right-hand side of the piston in range-selection cylinder 5, while the left-hand chamber is connected to vent 2f. Consequently, the piston is shifted to the left and the transmission switched to the high-speed range.

Until the vehicle speed drops sufficiently to permit the spring 49b to become effective to displace the valve 49 into its illustrated position in FIG. 2, position 49d of this valve remains effective to provide low pressure at position 2d and high pressure at position 2e so that the relay valve will not operate in spite of operation of the pilot valve 1 in the downshifting sense. When the vehicle speed drops, however, the valve 49 shifts to permit the development of a high pressure at 2d and the draining of pressure at 2e upon actuating of the pilot valve 1.

The high-pressure at relay valve input 2e is also applied to the adjuster cylinder 48b to stress the spring 48c of the valve 48 controlling the first lock means and hence compensating for an input pressure at 48a in the high-speed range. The valve 48 and cylinder 11 operate in the manner previously described. The pressure at inputs 48a and 49a to the valves 48 and 49 is derived from the lines 50 and 51 connected to the discharge side of a pump 46 driven at the vehicle speed and provided in circuit with a reservoir and a throttle 47 as previously described. In FIGS. 1 and 2, the positions A, B and C represent positions of the shaft 20 with the position A corresponding to the "Reverse and Crawl" modes of the transmission, the position B corresponding to first and second or fifth and sixth speeds and the position C corresponding to third and fourth or seventh and eighth speeds.

Figure 3:
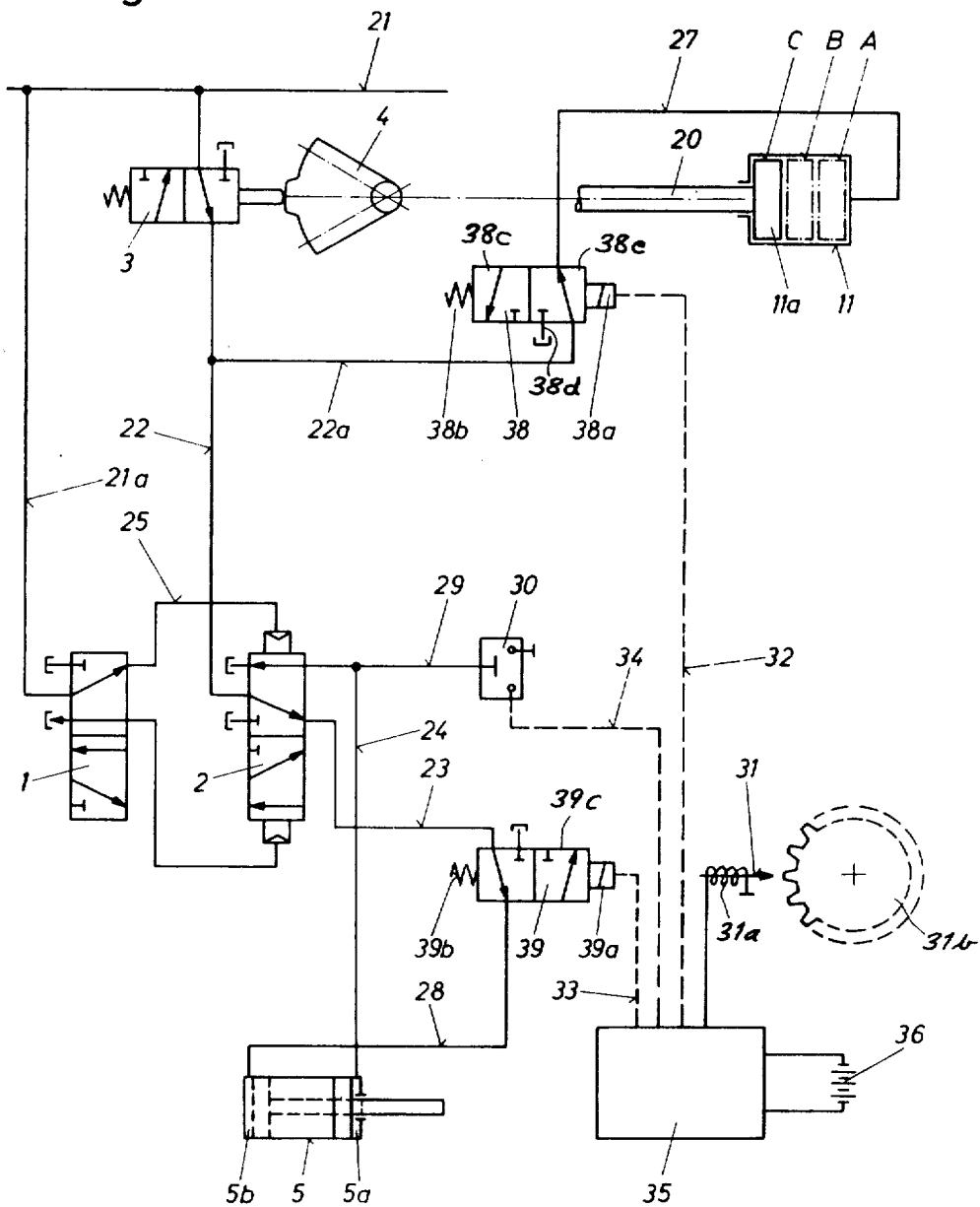
FIG. 3 is a circuit diagram representing the principles of the system of FIG. 1 as applied to electrically controlled valves.
Figure 4:
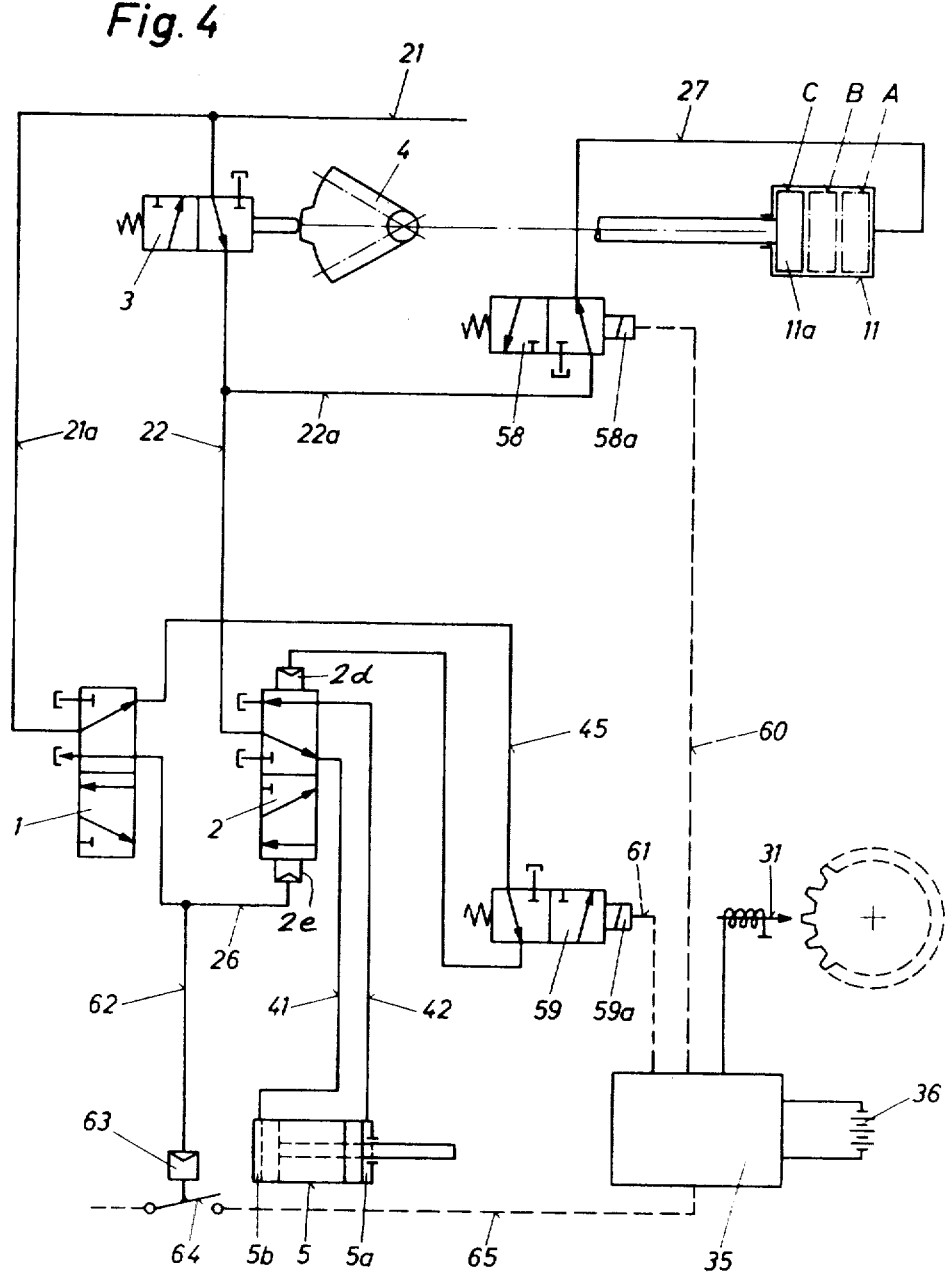
FIG. 4 is a diagram illustrating aspects of the invention shown in FIG. 2 with electrical analogs.

In FIGS. 3 and 4, we show a system operating in part in accordance with electrical principles and provided with a pulse generator 31 coupled with the vehicle power train for producing a pulse train at a frequency proportional to the vehicle speed. The pulse generator 31 may include an inductor 31a juxtaposed with a toothed wheel 31b, each tooth of which sweeps past the inductor to induce a pulse therein. The pulse train is applied to an electronic switch 35 having a DC input as represented by the battery 36 and producing outputs at 32 and 33 which are effective upon the valves 38 and 39, respectively, controlling the first and second lock means by solenoids shown at 38a and 39a, respectively.

The valves 38 and 39 of the embodiment illustrated in FIG. 3 are provided directly in the power circuit for the cylinders 11 and 5 respectively and are analogous to the valves 8 and 13 shown in FIG. 1. In FIG. 4, the corresponding valves 58 and 59 are provided one in the power circuit and the other in the pilot circuit by analogy with the system of FIG. 2.

In FIG. 3, we have shown the components in positions corresponding to the transformation from the third or fourth speeds to the fifth speed. Upon completion of the acceleration from the fourth speed and when switched over the fifth speed is required. The control voltage at line 32 is zero as represented in FIG. 7 for the transition from b to c (b-c). The valve 38 is shifted by the spring 38b to its right-hand position and section 38c of this valve is thereby rendered effective to vent cylinder 11 at 38d and block line 22a. The piston 11a can then be displaced from position C to position B.

In the first through fourth speeds, the pressure-responsive switch 30 which is connected to the line 24 feeding the right-hand compartment 5a of the range-cylinder 5, remains open. As soon as cylinder chamber 5a is pressurized to shift the cylinder to the high-speed range, the pressure in line 29 likewise increases to close the switch 30. Switch 30 is in circuit with the device 35 via line 34 and provides a higher threshold such that line 32 remains at a zero current level in the range b-c (FIG. 7). Only with the increase pulse frequency (corresponding to increased vehicle speed) does a current develop at line 32 to counteract the spring 38b and render position 38e of the valve effective. Line 33 receives current as soon as the speed n exceeds the valve b of fourth speed as represented in FIG. 6. When line 33 is energized, the electromagnet or solenoid 39a is rendered effective to shift the valve 39 against the force of spring 39b and place in operational position 39c of the valve to vent line 28. Line 23 is closed in this position. It will be apparent, therefore, that aside from the substitution of the electrical components the circuit of FIG. 3 operates in the method described in FIG. 1 to prevent downshifting from a higher speed set to a lower speed set and from the high-speed range to the low-speed range at excessive vehicle speeds.

In the embodiment of FIG. 4, the valve 49 is provided in the pneumatic control circuit for the relay valve 2, i.e., in the line 45 which connects the pilot valve 1 with the upper cylinder 2d of the relay valve. To provide a reference for the electrical pulse generator and establish an appropriate threshold in accordance with the selected speed range, a line 62 is connected with line 26 between the pilot valve 1 and the lower cylinder 2e of the relay valve 2 and feeds a pressure responsive switch 63, 64, the contacts of which are connected in circuit 65 with network 35.

When the threshold b (FIG. 6) is exceeded, a current (+ in FIG. 8) appears at line 61 to shift the valve 59 to the left and vent line 45. At speed ranges below the threshold b no current appears at line 61. The piston 11a of the first locking device is shown in its position C in FIG. 4. Since the shifting cylinder 5 is in its low-speed range, the transmission can be operated in third or fourth speed. When the vehicle speed exceeds the threshold B (FIG. 6), the solenoid 58a of valve 58 is deenergized in accordance with the table of FIG. 7 and the valve 58 is thereby shifted to the right to vent line 27 and permit the main transmission to be brought into its position B.

The invention as described and illustrated is believed to admit of many modifications within the spirit and scopes of the appended claims and which are, therefore, intended to be included therein.

We claim:

1. A transmission system for a motor vehicle, comprising:
   transmission means including gears defining a plurality of transmission speed sets, each with a plurality of particular transmission speeds;
   a speed-selector shaft operatively connected to said movable gears and axially shiftable to permit selection of one of a plurality of transmission speed sets and rotatable to permit selection of a particular transmission speed of one of said sets;
   means responsive to the speed of the vehicle;

transmission-locking means operatively connected to said means responsive to the speed of said vehicle and operatively connected to said shaft for restricting said axial displacement of said shaft to prevent down-shifting from a higher-speed set to a lower-speed set until the vehicle speed falls below a predetermined value.

2. The system defined in claim 1 wherein said transmission-locking means includes a cylinder, a piston shiftable in said cylinder and connected with said shaft, a valve communicating between a source of power fluid and said cylinder and means for controlling said valve in response to the speed of the vehicle for permitting displacement of said piston within said cylinder upon a vehicle-speed decline below said value.

3. The system defined in claim 2 wherein said valve is provided with a biasing spring having a stress determining said value.

4. The system defined in claim 3 wherein said transmission means has a high-speed range and a low-speed range selective independently of the operation of said speed-selector shaft, said system further comprising means for adjusting the value in accordance with the effective range.

5. The system defined in claim 4 wherein the last mentioned means includes an adjusting motor for varying the stress of said spring.

6. The system defined in claim 4 wherein said means for controlling said valve in response to the speed of said vehicle includes a pump driven at a rate proportional to the vehicle speed, a throttle connected to the discharge side of said pump, and a cylinder connected to said pump between said discharge side and said throttle and acting upon said valve opposite said spring.

7. The system defined in claim 1 wherein said transmission means includes a speed-changing mechanism operable independently of said shaft for establishing a high-speed range and a low-speed range, said system further comprising second transmission-locking means effective independently of the first mentioned transmission-locking means and operatively connected with said mechanism for restricting downshifting thereof from said high-speed range to said low-speed range until the vehicle speed falls below a predetermined value.

8. The system defined in claim 7 wherein said mechanism includes speed-changing gearing and a range-selection cylinder operatively connected to said gearing and energizable with a pressure fluid to select the speed range.

9. The system defined in claim 8 wherein said mechanism further comprises a main valve connected in a fluid path between a source of fluid under pressure and said cylinder, said shaft being provided with a rotatable cam and said valve having a cam follower engaging said cam for pressurization of said cylinder exclusively in a "neutral" position of said shaft corresponding to a position thereof intermediate speeds of the respective sets.

10. The system defined in claim 8 wherein said transmission-locking means includes a locking cylinder having a piston operatively connected to said shaft and axially shiftable therewith, a valve communicating between a source of pressure fluid and said locking cylinder, and means responsive to the vehicle speed for shifting said valve, said range-selection cylinder being connected to said valve for establishing the value at which downshifting from a higher-speed set to a lower-speed set is prevented.

11. The system defined in claim 8 wherein said second transmission-locking means includes a pilot valve actuatable by the vehicle operator, a relay valve connected with said pilot valve and communicating with said cylinder and a locking valve in fluid communication with said relay valve for controlledly restricting operation of said cylinder.

12. The system defined in claim 11 wherein said locking valve is provided with a biasing spring, said second transmission-locking means further comprising means responsive to the vehicle speed and acting upon said locking valve counter to said spring.

13. The system defined in claim 12 wherein the last mentioned means includes a pump driven at a rate proportional to the vehicle speed, a throttle connected to the discharge side of said pump and means connecting said discharge side of said pump with said locking valve.

14. The system defined in claim 12 wherein the last mentioned means includes a pulse generator driven at a rate proportional to said vehicle speed for producing an electrical-pulse train of a frequency proportional to vehicle speed and electromagnetic means connecting said pulse generator with said locking valve.

15. The system defined in claim 12 wherein said locking valve is interposed between said pilot valve and said relay valve for selectively preventing and permitting operation of the latter.

* * * * *